Sept. 29, 1959    A. T. SWEET    2,906,465
ORE TREATMENT
Filed June 10, 1957    3 Sheets-Sheet 1

INVENTOR.
Andrew T. Sweet
BY
Attorney

Sept. 29, 1959  A. T. SWEET  2,906,465
ORE TREATMENT
Filed June 10, 1957  3 Sheets-Sheet 2

INVENTOR.
Andrew T. Sweet
BY
Attorney

Sept. 29, 1959  A. T. SWEET  2,906,465
ORE TREATMENT
Filed June 10, 1957  3 Sheets-Sheet 3

INVENTOR.
Andrew T. Sweet
BY
Attorney

United States Patent Office

2,906,465
Patented Sept. 29, 1959

2,906,465

ORE TREATMENT

Andrew T. Sweet, Denver, Colo., assignor to South Western Minerals Corporation, a corporation of Delaware Application June 10, 1957, Serial No. 664,539

9 Claims. (Cl. 241—24)

The present invention relates to ore treatment generally, and more particularly to the upgrading of ore wherein minerals are deposited or coated upon the surface of hard material or rock particles that are capable of being rendered discreet by crushing.

In the handling of ore to recover its mineral content, it has been customary to grind the ore to a very fine mesh and then treat the ground ore with chemicals to extract the minerals therein. In this process not only is the mass material ground to the same fine mesh as the minerals, but since it is difficult to separate from the mixture, it must go through the chemical treatment as a non-productive load on the system in order to recover the minerals present in the grind. Because of the expense of this non-productive load on the process many otherwise valuable low grade ores are not considered to be of commercial grade, i.e. a grade which can be profitably handled at a certain price for the small amount of valuable minerals extracted. Such ores are left untouched, or, are separated from higher grade portions and dump piled without grinding or treating. This is particularly true where nature has deposited minute quantities of minerals on particles of mass or alluvial material such as sand and the conglomerate subsequently has hardened or cohered to form solid ore. Moreover, with present processes in which the ore is ground, many materials of which the ore is composed form objectionable slime in subsequent wet treatments and thereby further lower the commercial value of such ores. Also, it will be appreciated that transportion to a mill of the ore mass figures heavily in determining the commercial acceptability of mining the ore.

Although the invention will work with any sedimentary deposition of mineral, such as uranium, copper oxides and carbonates, zinc carbonate and the like, it will be described in connection with the upgrading of uranium ($U_3O_8$) as adhered to sand or sand stone types of alluvial material.

One of the objects of the invention is to take discreet particles of hard material that have smaller particles of uranium cemented to their surface and without breaking or chipping the larger particles, scuff off the uranium in the form of uranium dust concentrate whereupon the mass is swept by air and the larger particles fall in one classifier while the uranium and other material scuffed off is carried over into another classifier as fine dust ready for the recovery of the uranium therefrom according to well known processes.

Another object of the invention is to crush a solid mass of particles such as sand, cemented together with mineral fill without reducing the particle size below the natural particle size, thereby saving upon grinding expenses, and thereafter scuffing the particles against each other under motions imparted thereto and under forces including gravity and centrifugal force.

The invention is also characterized by rubbing discreet particles together to polish from their surface the mineral coatings deposited thereon and thereby further grinding the minerals to the fineness of a dust that is acceptable for treatment in a wet process for the recovery of the mineral therein without incurring slime from the material of the particles themselves.

A further object of the invention is to return to their original dry form the material which was deposited in wet or colloidal form by nature upon the surfaces of discreet particles of rock having interstices affording surface access for said wet deposition.

The invention also contemplates less movement of coated particles than that necessary to crack them whereby only the mineral coated is removed and pulverized to a dust form, and the longevity of the scuffing machine is greatly increased with no need for water to be used in the upgrading process.

Generally speaking, mineral bearing materials that are deposited by water flow or settling do not include slime in conventional ore extraction wet processes, and one of the objects of the invention is to recover the mineral bearing deposits without contamination thereof with materials which will cause slime.

A further object of the invention is to provide a machine for scuffing deposited coatings from discreet particles without cracking or chipping them which is highly efficient, inexpensive to operate and maintain, easily repaired, and capable of operation by mechanical or electrical power with continuous rotation of a unitary balanced assembly of moving parts.

These being among the objects of the invention other and further objects will appear from the description of the drawings relating thereto, and the appended claims.

Referring now to the drawings.

Figure 1:
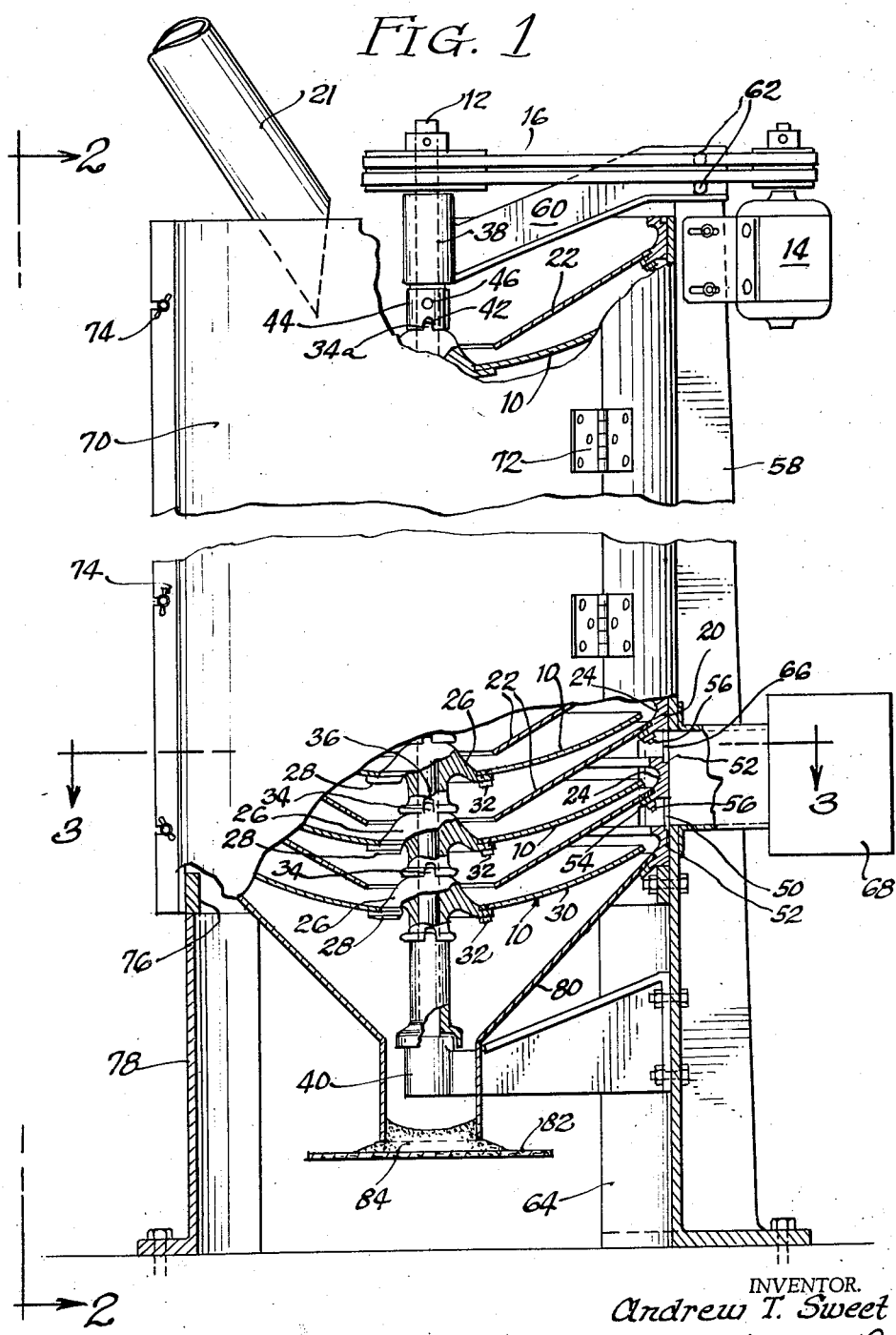
Fig. 1 is a side elevational view of a preferred form of the mechanical portions of the invention in which mineral dust is scuffed from the surfaces of discreet particles of sand or rock, preparatory to air separation.
Figure 3:
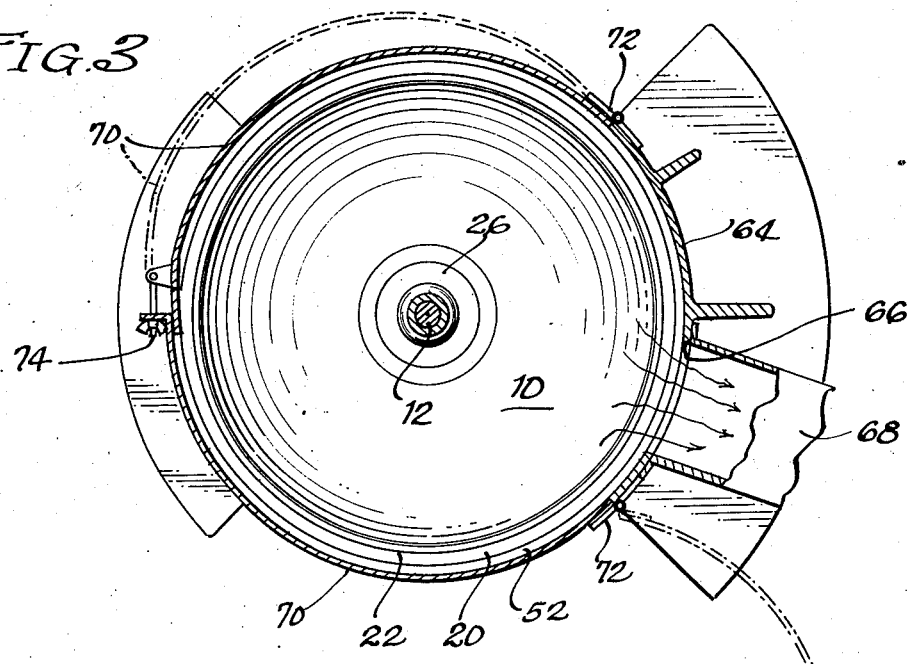
Fig. 3 is a section taken on line 3—3 in Fig. 1.
Figure 2:
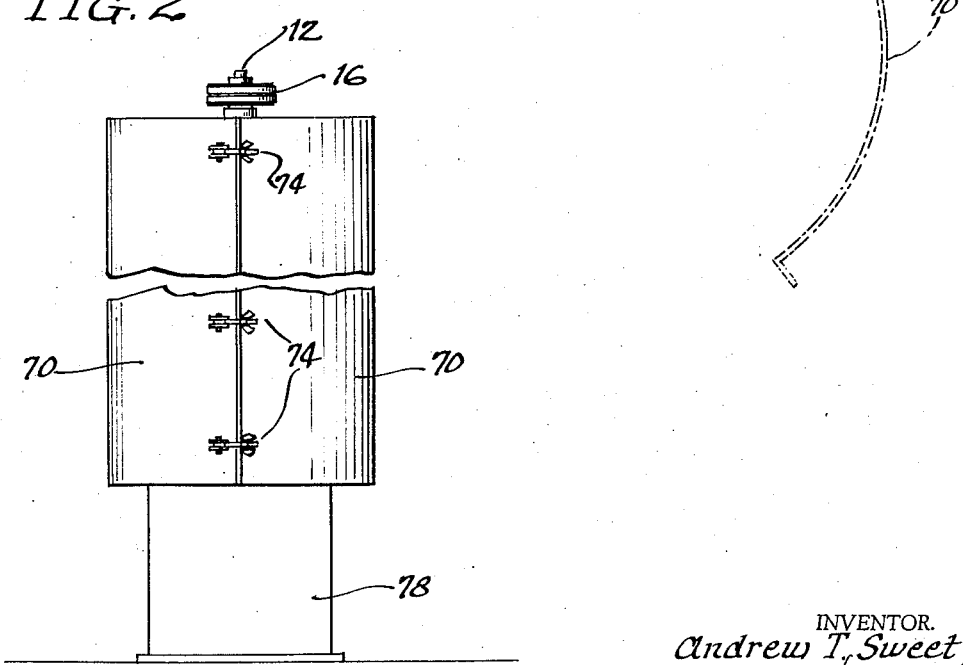
Fig. 2 is a front elevational view of the device shown in Fig. 1.

While it is appreciated that the process herein described can be accomplished in a small and tedious way, by rubbing sand particles together between a person's hands, or tumbling them in a barrel-like device for long periods of time, the present invention contemplates the use of a series of concave plates or arcuate disks rotated about a vertical axis extending through their centers at a speed just great enough for the discreet particles to be carried over the edge of an upper disk with little if any flinging force and then to be tumbled down a conical wall and returned to the center of the next lower disk for a repetition of this step time and time again.

In performing the process of the invention, a granular ore having a mineral bearing coating on the grains or particles is broken up into its constituent grains or particles, if they are not already discreet, and the mass is fed progressively onto a dish-shaped rotating disk at the center thereof. As the discreet particles begin to rotate with the disk, they roll against each other in attrition or a scuffing relation. This scuffing increases as the particles begin to move outwardly and the farther they move in a radial direction the more rolling there is imparted to the particles each in the same direction but with contacting surfaces moving in the opposite direction. Moreover, as the centrifugal force increases, the wall of the disk which curves upwardly opposes the centrifugal action and between the weight of the particles and the adverse inclination of the wall, the particles are scuffed by the wall as well as among themselves. Further outward movement thins out the particles more for mutual attrition and finally they leave the edge tangentially only to engage a stationary and curved surface free of radial obstructions against which the particles scuff to a non-rotative halt only to roll against each other down an incline back to the center of the next lower disk again to repeat the ordeal time and time again, until the mineral bearing coating is scuffed off and only polished particles and dust remain.

It is preferred to draw air mildly through the upper portions of the disk assembly to avoid waste of mineral dust, yet enable continuing attrition to pulverize pieces of mineral coating that may have been scuffed off in particles larger than dust particles. Near the bottom of the disks the dust is removed with the withdrawn air to be collected for processing and the material flowing out of the bottom of the machine is conveyed to an air classifier for final separation of any remaining dust. The unbroken particles that have been cleaned of their coating remain heavy enough to assure high efficiency classification of themselves for the discard pile.

Such results have been attained that ores as low as 0.1 percent $U_3O_8$ have been upgraded 10 to 20 times with better than 70% recovery under dry conditions in which medium grained sand particles were handled that were cemented together by mineral bearing material and any cracking of the sand particles could cause slime conditions in the extracting process. This enables a salable concentrate to be made at the mine from otherwise non-commercial ore, and can be trucked long distances to a mill, profitably. The upgrading process has also had comparable results with higher grade ores where transportation would be a large expense.

The preferred embodiment of the invention is shown in the drawings in which, preferably ten dish-shaped disks 10, five feet in diameter are rotated as a unit by a shaft 12 driven by a motor 14 through a pulley-belt speed reduction drive 16 at approximately 240 r.p.m. to provide them with a peripheral speed of approximately 3600 feet per minute. At the edge of each disk is a ring 20 which supports a conical baffle 22. The ring is contoured at 24 to catch the particles leaving the edge of the disk on a curved surface that scuffs the surface of the grains as their rotary movement is being stopped thereby. The grains are then released onto the upper surface of the conical baffle 22, to tumble back to the center of the machine and be discharged on the next lower disk 10 and scuffed again as described. Thus, between relative counter rotative movements of the successive disks 10 and cones 22, the particle movement is accelerated and decelerated repeatedly by scuffing and tumbling action among particles and between the particles and the machine parts handling them.

Any size of disk 10 greater or lesser in diameter may be used within reasonable limits, so long as the peripheral speed is not great enough to cause the grain particles to be cracked when they contact the ring at contour 24. If cracking appears in the end product, the machine should be slowed down to a speed where such disappears, or is no greater than that which may be present in the crushed ore before scuffing. The five foot diameter is desirable for good results and large capacities.

For purposes of assembly, inspection and replacement, the disks 10 are provided with cast metal hubs 26, flanged at 28 to receive the dished portion 30 in supported relationship as secured by bolts 32. The length of the hub 26 serves as spacing between disks and the opposite ends are provided with driving elements, the upper end having a diametrically disposed land 34 and the lower part with a diametrically disposed mating groove 36. The shaft 12 extends down through all hubs as received through the inner races of sealed frictionless bearings 38 and 40 at the top and bottom, respectively. The upper land 34 on a lower hub engages in the groove 36 on the next above hub until the top is reached and the land on top 34a of that hub engages in the groove 42 of a drive collar 44 fastened to the shaft in rotary drive relationship by a set screw 46. The collar may be provided with a V-belt drive groove itself, but preferably the shaft is driven from a multi-belt pulley keyed thereto as driven from a pulley on the prime mover 14 such as an electric motor. The pulley speed ratio is determined by the driving and desired driven speed.

The rings 20 are similarly stacked with depending spacing legs 50 engaging in indexing grooves 52 on top of the next ring below with the wall of the ring at the foot of the contour 24 offset at 54 to support the conical sheet metal return element 22 as by screws 56.

Thus with the screws 32 and 56 removable, worn parts may be replaced, and with the stacked arrangement of the cooperating parts, any number of disks may be provided up to the limits of the frame 58 which carries the motor and the removable upper bearing arm 60 fastened to the top of the frame by bolts 62.

The frame has some circumferential expanse 64 at the bottom and throughout its length, over a vertical area of approximately the lower two disks where a hole 66 is provided through which the dust is withdrawn by a collector device indicated diagrammatically at 68.

Also mounted upon the frame are two housings 70 hinged at 72 to enclose collectively and with the frame, the working area of the rings and disks. Where the housings overlap they are drawn tightly against the outer surfaces of the rings in sealed relation by snap toggle bolts 74.

Figure 4:
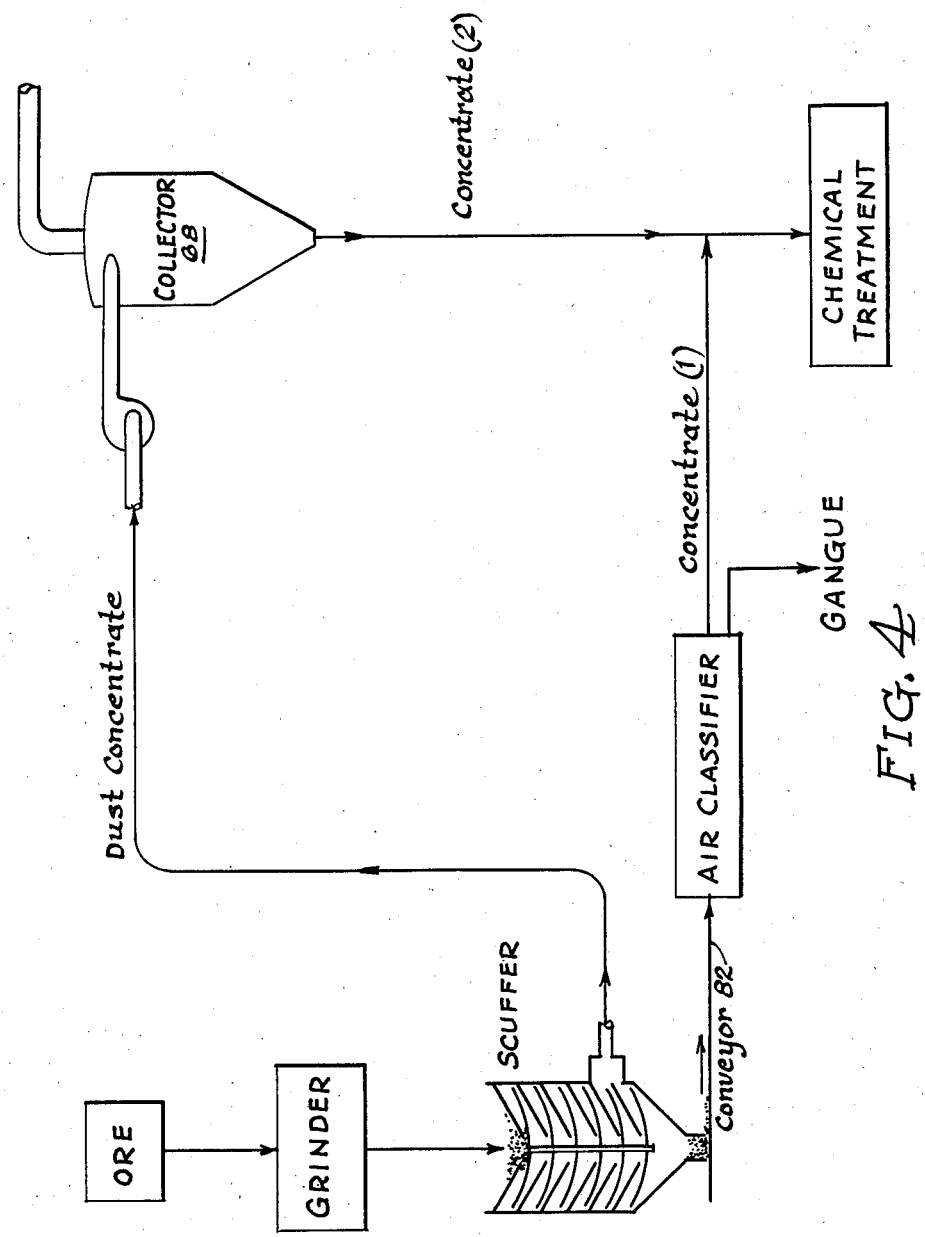
Fig. 4 is a flow sheet which diagrammatically illustrates the preferred way the process may be carried out.

At the bottom, a frame ring 76 and legs 78 therefore are provided to support the device and a collector cone 80 is provided to catch the abraded particles and remaining dust to drop same on a conveyor belt 82 which carries the complex to a conventional air classifier (shown in Fig. 4) which separates the dust from the sand particles. It will be noted that the conveyor belt runs sufficiently close to the bottom of the cone 80 that abraded particles can pile up at 84 sufficiently to seal the outlet opening against inflowing air.

Thereafter the sand is discarded and the two collections of dust combined and taken to a mill for chemical treatment according to well known practices to recover the mineral content of the dust.

It will be observed that if there is any difficulty experienced during operation, the housings 70 can be opened and visual inspection of all parts made between legs 50. If disassembly is desired, the upper bearing and frame are removed after the upper pulley is loosened and the shaft 12 can be withdrawn upwardly if desired. Thereafter the rings and disks can be successively lifted out separately or, as a group until the trouble is remedied and the assembly remade in reverse order to resume operations.

When parts are worn they can be replaced and repaired as already described.

In operation, a conveyor belt (not shown) drops the crushed conglomerate onto the top conical member 22 through a chute 21 and the discreet particles gravitate to the center where they are picked up, scuffed and delivered by the top disk 10 to the adjacent contour 24 for further scuffing and rolled down the next conical member 22 etc., until the bottom is reached. An inflow of air at the top is maintained, and the drain catch 80 at the bottom is kept full at the bottom thereof by the proximity of the conveyor belt to prevent intake of air at that point. Thus, the interior of the device is operated at pressure slightly less than atmospheric pressure and no dust is lost. Moreover, a portion of dust is recovered at the collector and the load at the classifier is substantially lessened.

Having thus described the process and preferred means for accomplishing same, it will be observed by those skilled in the art how the objects states are attained and how various changes and modifications can be made with- out departing from the spirit of the invention, the scope of which is commensurate with the appended claims.

What is claimed is:

1. The process of upgrading a low grade ore having a sedimentary deposition of mineral on the surfaces of particles comprising breaking down the ore to the discreet particles, confining the discreet particles to flow along a predetermined path and repeatedly scuffing said grains frictionally with each other and with smooth surfaces under influences of centrifugal force and gravity and alternately therewith rolling said discreet particles in contact with each other under the influence of gravity to polish off and pulverize said mineral deposits to a dust without cracking the discreet particles, progressively withdrawing a portion of the mineral dust as a concentrate at an intermediate stage of said scuffing and rolling, and separating the remaining portion of the mineral dust as a concentrate from the discreet particles after said scuffing and rolling.

2. The process of upgrading a low grade ore having a sedimentary deposition of mineral on the surfaces of discreet particles comprising breaking down the ore to the discreet particles, confining movement of the discreet particles along a predetermined path to a movement less than that necessary to crack them and in quantity to scuff the particles in fractional contact with each other and with surfaces supporting the particles against gravity and thereby polish off and pulverize said mineral deposits to a dust, progressively separating by air drawn through the particles at an intermediate point along said path a portion of the mineral dust as a concentrate during said scuffing, and removing the remaining dust after said scuffing.

3. The process of upgrading a low grade ore having a sedimentary deposition of mineral on the surfaces of discreet particles comprising confining the discreet particles to flow along a predetermined path under centrifugal force and gravity including scuffing said particles against each other under the influence of progressively increasing centrifugal forces on a gradually widening smooth rotating surface which curves upwardly towards its edge to oppose centrifugal action and between the weight of the particles and the increasing peripheral curvature scuffing the particles with the surface under an increasing frictional contact with the surface, scuffing the particles on a curved smooth concave surface bordering the rotating surface without cracking the discreet particles and rolling the particles in contact with each other under the influence of gravity in a converging direction, said scuffing and rolling polishing off and pulverizing said mineral deposits to a dust concentrate of said mineral deposits, and separating the dust concentrate from the discreet particles.

4. An upgrader comprising a plurality of upwardly concave disks mounted for rotation in spaced horizontal planes about a common vertical axis, a plurality of downwardly sloping elements disposed between the disks, means including a concave circular surface spaced from the outer edge of the disks and contiguous with the surface of element therebelow, a housing enclosing said disks, downwardly sloping elements and said means, means for rotating said disks whereby grains of sand centrifugated from the disk scuff against said means without cracking and chipping, means to catch the treated ore at the bottom of said housing, said disks having hollow hubs resting one upon another, a shaft extending through said hubs in supporting relation, means intermediate said hubs for driving one from another.

5. An upgrader comprising a plurality of concave disks curving upwardly to their peripheral edges mounted in vertically spaced relationship for rotation about a vertical axis, a plurality of inwardly sloping elements disposed between the disks, means between said elements having a circular smooth concave inwardly facing wall spaced radially from the edges of said disks and contiguous with the top surfaces of the respective elements, means for feeding comminuted ore particles to the top of one of said disks, means for rotating said disks whereby said particles centrifugated from the disks scuff against the curved disks and against said wall without cracking and chipping, and means to catch the treated ore below the bottom of the lowermost of said elements.

6. An upgrader comprising a plurality of upwardly forcing smooth-surface-concave disks mounted in vertically spaced relationship for rotation about a vertical axis, a plurality of inwardly sloping elements disposed between the disks, means between said elements having a circular smooth wall spaced radially from the edges of said disks and contiguous with the top surface of the respective elements, means for feeding comminuted ore particles to the top of one of said disks, means for rotating said disks whereby said particles centrifugated from the disks scuff against said wall without cracking and chipping, means for removing dust from within said circular smooth wall intermediate the top and bottom thereof, and means to catch the remaining dust and treated ore at the bottom of lowermost downwardly sloping element.

7. An upgrader comprising a housing, a plurality of concave disks curving upwardly to their peripheral edges mounted in vertically spaced relationship for rotation about a vertical axis, a shaft extending through said disks in supporting relationship, a plurality of inwardly sloping elements disposed between the disks, means between said elements defining a surface of revolution concave towards the vertical axis and spaced radially from the edges of said disks and contiguous with the top surface of the respective elements, means for feeding comminuted ore particles to the top one of said disks, means for rotating said disks whereby said particles centrifugated from the disks scuff against said wall without cracking and chipping, means to catch the treated ore at the bottom of said housing, and means for drawing a partial vacuum in said housing above the lowermost one of said elements.

8. An upgrader comprising a plurality of spaced downwardly and inwardly sloping elements opening at their lower ends, a plurality of concave disks having gradually widening upwardly facing smooth surfaces between the elements, said surfaces having a gradually increasing upward inclination from said lower ends to their edges, circular rings between the outer edges of said elements bordering the edges of said disks and having walls defining inwardly facing concave surfaces of revolution, means for rotating said disks whereby discreet particles coming to rest on a disk below the lower end opening of an element scuff against each other and the upwardly facing surface of the disk under the influence of progressively increasing centrifugal forces and an increasing frictional contact with said upwardly facing surface, and particles centrifugated from the disk scuff against said walls without cracking and chipping, and against said elements, and means to catch the discrete particles below said rotating disks.

9. An upgrader comprising a plurality of inwardly sloping elements, means between said elements having a wall defining an inwardly facing concave surface of revolution contiguous with the top surfaces of the elements therebelow, a plurality of disks between said elements having smooth concave surfaces curving upwardly to peripheral edges spaced radially from said surfaces of revolution and mounted for rotation about a vertical axis, means for feeding comminuted ore particles, to the top of one of said disks, means for rotating said disks whereby particles thereon scuff against each other the disks and said walls with an increasing centrifugal force and an increasing frictional opposition thereto without cracking and chipping, and means to catch the scuffed particles below said elements.

(References on following page)

References Cited in the file of this patent

UNITED STATES PATENTS

| | | |
|---|---|---|
| 582,873 | Nilsson et al. | May 18, 1897 |
| 1,145,772 | Josey et al. | July 6, 1915 |
| 1,147,203 | Andrews | July 20, 1915 |
| 1,147,211 | Coleman et al. | July 20, 1915 |
| 1,636,033 | Agnew | July 19, 1927 |
| 2,136,726 | Osbourne | Nov. 15, 1938 |
| 2,175,484 | Rees et al. | Oct. 10, 1939 |
| 2,246,567 | Bencowitz et al. | June 24, 1941 |
| 2,388,471 | De Vaney | Nov. 6, 1945 |
| 2,478,733 | Wright | Aug. 9, 1949 |
| 2,780,417 | Harris | Feb. 5, 1957 |

FOREIGN PATENTS

| | | |
|---|---|---|
| 376,760 | Great Britain | July 5, 1932 |
| 521,071 | Canada | Jan. 24, 1956 |